Oct. 31, 1967 L. BAUER 3,350,516

PUSHBUTTON COVER RING

Filed April 27, 1964

INVENTOR
L. BAUER

Phillip A. Weiss
ATTORNEY

United States Patent Office 3,350,516
Patented Oct. 31, 1967

3,350,516

PUSHBUTTON COVER RING

Ludwig Bauer, Stuttgart-Stammheim, Germany, assignor to International Standard Electric Corporation, New York, N.Y., a corporation of Delaware Filed Apr. 27, 1964, Ser. No. 362,738
Claims priority, application Germany, May 2, 1963, St 15,913
2 Claims. (Cl. 179—179)

ABSTRACT OF THE DISCLOSURE

A self aligning movable cover ring for peripherally guarding pushbuttons such as those protruding from telephone sets. The ring also commonly known as a bushing, sleeve or ferrule comprises at its bottom side a pair of elastic flaps and a stud. The elastic flaps extend past the bottom side of the opening in the telephone case. The top bearing surface of the ring has a larger diameter than the diameter of the drill hole. A space is maintained between the sides of the ring and the inside of the drill hole. The flaps and stud in cooperation with the space between the ring and the drill hole act together to give sufficient play in the ring to enable self alignment while preventing the ring from moving radially.

The invention relates in general to telephone sets and in particular to self aligning cover rings for peripherally guarding pushbuttons aperture through which the pushbutton knobs protrude from telephone sets.

There are, for example, cover rings on telephone sets which serve to cover the drill holes in the casing around a pushbutton knob protruding from the casing. The rings themselves are movably arranged in the drill holes and can be arbitrarily turned, since the bearing surface is perpendicular to the axis of the ring.

Other known rings without elastic flaps are installed into the casing with a bearing surface inclined towards the axis of the ring. In order to prevent the rings from turning at its bearing surface, the fixed flaps are deformed under heat after the ring has been inserted into the drill hole of the casing. This deformation of the flaps under heat to maintain the ring in place after installation is disadvantageous because it necessitates an additional working process.

An object of this invention is to create a cover ring which can be fixed in the drill hole of the casing and won't tend to twist or turn but at the same time will be sufficiently loose for self-alignment without necessitating further working processes causing increased costs.

This and other objects are achieved, according to the invention, by providing two elastic flaps at the bottom of the ring which are inserted into the drill hole of the casing and a stud through which the ring is kept in place in the casing of the telephone set.

According to a further embodiment of the invention the ring is movably mounted in the casing's drill hole and can thereby counteract deviations in the location of the pushbuttons without impairing the free movement of said button.

Figure 1:
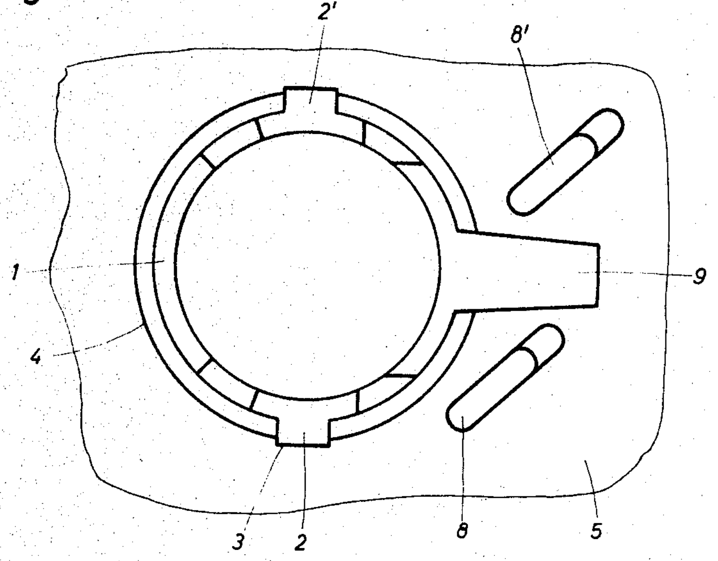
Figure 2:
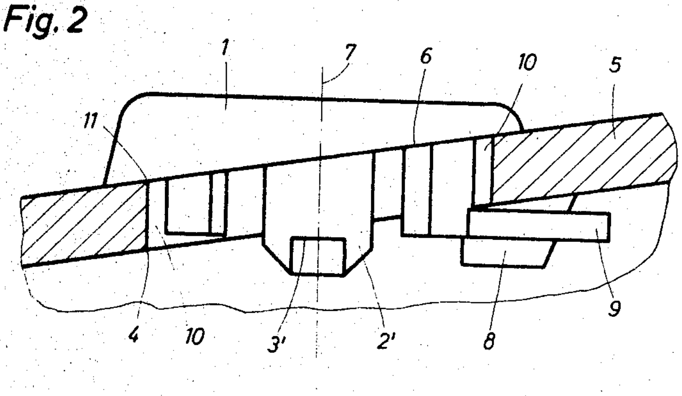

The invention is now described with the aid of an accompanying drawing; wherein:

FIG. 1 shows a portion of a telephone set casing, seen from the inside, with the cover ring inserted over the pushbutton hole; and FIG. 2 shows a cross section through a drill hole of the casing of a telephone set with the cover ring inserted thereover.

FIG. 1 shows a single-parted cover ring 1, provided with two elastic flaps 2 and 2', and with a stud 9. The telephone set casing bears the number 5. FIG. 1 further shows a portion of the casing 5, seen from the inside. The edge of the drill hole within the casing is marked with 4 and the two elastic flaps 2 and 2' extend with their edges 3 and 3' beyond the drill hole edge 4 of the casing 5. On the inside of the casing 5 two cams 8 and 8' are provided between which the stud 9 of the cover ring 1 will be located when the ring is inserted. By said flaps 2 and 2', and by the stud 9 the ring is loosely locked in the case 5 and kept in place, safe against turning but with a certain amount of free-play.

FIG. 2 shows a section through a drill hole in the casing into which a single-parted cover ring is inserted. The edge 3' of the elastic flap 2' engages in rear of the interior edge 4 of the drill hole. The stud 9 is located, as already described, between the cams 8 and 8' spray-moulded inside of casing 5. The bearing surface 6 of the case is not perpendicular to the ring axis 7.

Further, the diameter of the bearing surface 6 is greater than the diameter of the drill hole so that the outer periphery 12 of the bearing surface extends beyond the drill hole and rests on the case. This prevents the ring from falling through the drill hole.

The ring is prevented from turning unduly but a suitable amount of free-play is allowed of the stud 9 between the cams 8 and 8' of the casing 5. The space 10 between the ring 1 and case 5 allows the ring 1 to have any position necessary to accommodate the pushbutton without the upper edge 11 of the drill hole in the casing becoming visible from the outside.

Functionally the cover rings are placed within a plurality of drill holes in the telephone case. The peripheral overlap of the bearing surface past the periphery of the drill holes keeps the rings from falling through the case. The elastic flaps tend to lock the ring in place. The stud at the bottom of the ring prevents the ring from rotating about its axis. The space between the sides of the drill holes and the inside of the ring enables sufficient play of the ring within the hole so that there is no difficulty in aligning the knobs of the pushbuttons and bringing them through the cover rings. The pushbuttons are, of course, held in place in any well known manner, such as by return springs.

While the principles of the invention have been described above in connection with specific apparatus and applications, it is to be understood that this description is made only by way of example and not as a limitation on the scope of the invention.

I claim:

1. A movable self-aligning pushbutton cover ring for peripherally guarding pushbuttons protruding from telephone sets, said ring comprising a top side which protrudes from the top of the telephone set when operatively mounted on the telephone and a bottom side which remains within the telephone set when said ring is mounted, said top side having a radius greater than the radius of said bottom side and having a bearing surface which bears against a telephone set when said ring is mounted, means for providing space between the sides of said ring and said case, a plurality of elastic flaps extending substantially normal to the axis of said ring beyond the outer periphery of said bottom side of said ring to keep said ring mounted in the telephone set, and a stud extending normal to the axis of said ring beyond the outer periphery of said bottom side to control the turning freedom of said ring.

2. A movable self-aligning pushbutton cover ring for peripherally guarding pushbuttons protruding from telephone sets, said ring comprising a top side which protrudes from the top of the telephone set when operatively mounted on the telephone and a bottom side which remains within the telephone set when said ring is mounted, said top side having a radius greater than the radius of said bottom side and having a bearing surface which bears against a telephone set when said ring is mounted, means for providing space between the sides of said ring and said case, a plurality of elastic flaps extending substantially normal to the axis of said ring beyond the outer periphery of said bottom side of said ring to keep said ring mounted in the telephone set, a stud extending normal to the axis of said ring beyond the outer periphery of said bottom side to control the turning freedom of said ring and wherein said bearing surface is at an angle other than normal to said axis of said ring.

References Cited

UNITED STATES PATENTS

| | | | |
|---|---|---|---|
| 2,280,438 | 4/1942 | Matthews | 179—158 |
| 2,639,356 | 5/1953 | Savage | 200—172 |
| 3,239,640 | 3/1966 | Turnbull | 200—168 |

KATHLEEN H. CLAFFY, *Primary Examiner.*

L. A. WRIGHT, *Assistant Examiner.*